(12) United States Patent
Bowley (10) Patent No.: US 11,839,883 B2
(45) Date of Patent: *Dec. 12, 2023

(54) MODULAR CYCLONE

(71) Applicant: ENERCORP ENGINEERED SOLUTIONS INC., Calgary (CA)

(72) Inventor: Ryan Thomas Bowley, Calgary (CA)

(73) Assignee: ENERCORP ENGINEERED SOLUTIONS INC., Alberta (CA)

( * ) Notice: Subject to any disclaimer, the term of this patent is extended or adjusted under 35 U.S.C. 154(b) by 12 days.

This patent is subject to a terminal disclaimer.

(21) Appl. No.: 17/182,803

(22) Filed: Feb. 23, 2021

(65) Prior Publication Data

US 2021/0178405 A1 Jun. 17, 2021

Related U.S. Application Data

(63) Continuation of application No. 16/446,165, filed on Jun. 19, 2019, now Pat. No. 10,953,411.
(Continued)

(51) Int. Cl.
*B01D 45/12* (2006.01)
*B04C 3/00* (2006.01)
(Continued)

(52) U.S. Cl.
CPC ............ *B04C 3/06* (2013.01); *B01D 45/12* (2013.01); *B04C 2003/006* (2013.01); *B04C 2009/004* (2013.01)

(58) Field of Classification Search
CPC .......... B04C 5/103; B04C 5/185; B01D 45/12
See application file for complete search history.

(56) References Cited

U.S. PATENT DOCUMENTS 3,456,789 A 7/1969 Phipps
3,494,474 A 2/1970 Estabrook
(Continued)

FOREIGN PATENT DOCUMENTS

WO 2015162439 A1 10/2015
WO 2016134403 A1 9/2016
WO 2016153458 A1 9/2016

OTHER PUBLICATIONS

Office Action dated Sep. 29, 2022, Argentine Application No. AR 115632 A1, 4 pages.

*Primary Examiner* — Bradley R Spies
(74) *Attorney, Agent, or Firm* — MH2 TECHNOLOGY LAW GROUP, LLP (57) ABSTRACT

A cyclone sand separator kit, method, and separator, of which the kit includes a cyclone body having an inlet, a fluid outlet, and a solids outlet, the inlet being configured to receive a mixed fluid including a solid portion and a fluidic portion, the solids outlet being configured to receive the solid portion separated from the fluidic portion, and the fluid outlet being configured to receive the fluidic portion separated from the solids portion. The kit includes a plurality of cyclone inserts configured to be positioned in the cyclone body, at least partially between the inlet and the solids outlet and at least partially between the fluids outlet and the solids outlet. The cyclone inserts each define a vortical section configured to induce inertial separation of the mixed fluid, have different geometries including different inner diameters, lengths, angles, underflow outlet sizes, vortex finder placements, or a combination thereof.

19 Claims, 5 Drawing Sheets

Related U.S. Application Data

(60) Provisional application No. 62/690,061, filed on Jun. 26, 2018.

(51) Int. Cl.
*B04C 3/06* (2006.01)
*B04C 9/00* (2006.01)

(56) References Cited

U.S. PATENT DOCUMENTS

| | | | |
|---|---|---|---|
| 4,369,047 A | 1/1983 | Arscott | |
| 7,293,657 B1 * | 11/2007 | Kelton | B04C 5/081 209/722 |
| 10,953,411 B2 | 3/2021 | Bowley | |
| 2010/0267540 A1 | 10/2010 | Babb | |
| 2011/0297605 A1 | 12/2011 | Ross | |
| 2018/0050945 A1 | 2/2018 | McDonald | |
| 2018/0095011 A1 | 4/2018 | Lewis-Gray | |

\* cited by examiner

MODULAR CYCLONE

CROSS-REFERENCE TO RELATED APPLICATIONS

This application is a continuation of U.S. patent application having Ser. No. 16/446,165, which was filed on Jun. 19, 2019, and which claims priority to U.S. Provisional Patent Application Ser. No. 62/690,061, which was filed on Jun. 26, 2018. Each of these priority applications is incorporated herein by reference in its entirety.

BACKGROUND

A cyclone is a device that is used to separate and remove particles from a fluid. In one example, the fluid may be from a well and have sand particles dispersed therein. The particles may be removed based on a ratio of their centripetal force to fluid resistance. The ratio may be high for dense and/or coarse particles, and low for light and/or fine particles.

The cyclone may need to be replaced with a different cyclone in response to one or more properties of the fluid changing. The properties may be, for example, flow rate, viscosity, particle size, particle concentration, and the like. However, replacing the cyclone every time the properties change may be time-consuming and expensive. Therefore, what is needed is an improved cyclone that may be modified, rather than replaced, when the properties of the fluid change.

SUMMARY

Embodiments of the disclosure may provide a cyclone sand separator kit that includes a cyclone body having an inlet, a fluid outlet, and a solids outlet, the inlet being configured to receive a mixed fluid including a solid portion and a fluidic portion, the solids outlet being configured to receive the solid portion separated from the fluidic portion, and the fluid outlet being configured to receive the fluidic portion separated from the solids portion. The kit also includes a plurality of cyclone inserts configured to be positioned in the cyclone body, at least partially between the inlet and the solids outlet and at least partially between the fluids outlet and the solids outlet. The cyclone inserts each define a vortical section configured to induce inertial separation of the mixed fluid, and include different geometries including different inner diameters, different lengths for respective cylindrical sections thereof, different angles for respective conical sections thereof, different underflow outlet sizes, different vortex finder placements, or a combination thereof.

Embodiments of the disclosure may also provide a method for assembling a cyclone separator. The method includes determining a volumetric flow rate of fluid flowing out of a well, determining a target velocity of the fluid flowing through an inlet insert after the fluid flows out of the well, selecting the inlet insert from a plurality of inserts based at least partially upon the volumetric flow rate of the fluid and the target velocity of the fluid, selecting a cyclone starter insert from a plurality of cyclone starter inserts based at least partially upon a diameter of the cyclone starter insert and a first well flow condition, selecting a cyclone insert based at least partially upon a height of the cyclone insert and a second well flow condition, and inserting the inlet insert, the cyclone starter insert, and the cyclone insert into a cyclone body.

Embodiments of the disclosure may further provide a modular cyclone separator including a cyclone body having an inlet and an underflow outlet. The inlet is configured to receive a mixed fluid therethrough and into the cyclone body, and an underflow is separated from the mixed fluid and directed to the underflow outlet. The separator also includes an inlet insert removably positioned in inlet and coupled to an outside of the cyclone body, the inlet insert having a bore and a nozzle configured to direct the mixed fluid generally tangent to an interior surface of the cyclone body, at least a portion of the bore decreasing in diameter as proceeding to a tip of the nozzle. The separator further includes a cyclone insert removably positioned at least partially within the cyclone body, the cyclone insert having a conical cyclone and a height configured to produce a predetermined dwell time for fluid in the conical cyclone. The separator additionally includes a cyclone starter insert removably coupled to the cyclone insert and positioned in the cyclone body, the cyclone starter insert being received at least partially in the cyclone insert, and the cyclone starter insert being configured to induce a vortical flow in the mixed fluid received through the inlet insert. The separator also includes a sand collection vessel removably coupled to the cyclone body and in communication with the underflow outlet. The underflow is directed to within the sand collection vessel when separated from the mixed fluid in the cyclone body, and the cyclone insert and the cyclone starter insert are removable from within the cyclone body by disconnecting the cyclone body and the sand collection vessel.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1:
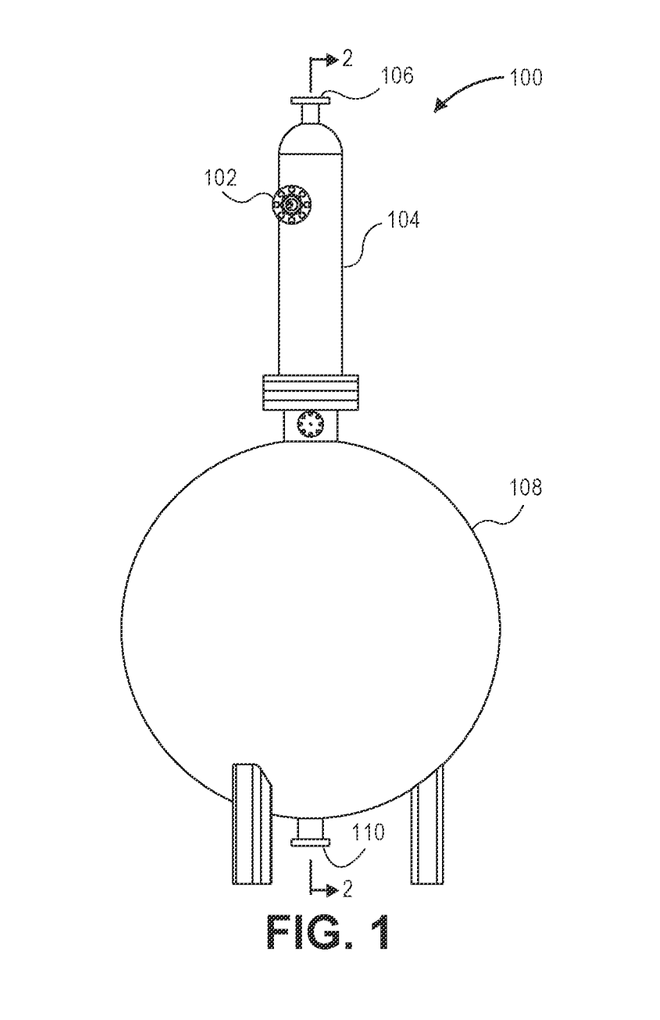
FIG. 1 illustrates a side view of a cyclone, according to an embodiment.

FIG. 1 illustrates a side view of a cyclone separator 100, according to an embodiment. The cyclone 100 may include an inlet 102 configured to receive a mixed fluid (e.g., a fluid containing two or more liquids or gases of different density, fluid containing liquids and solid particles, or some combination of the two). The cyclone 100 may also include a cyclone body (or "vessel") 104 that may define an internal volume (e.g., a hollow interior). As described in greater detail below, the mixed fluid may flow through the inlet 102 and into the cyclone body 104, and at least a portion of the particles may be separated/removed from the fluid in the cyclone body 104.

The cyclone 100 may also include an overflow or "fluid" outlet 106 through which the fluid may flow after at least a portion of the particles have been removed therefrom. If two gasses or fluids of different densities are being separated, the relatively lower density fluid may proceed through the overflow outlet 106.

The cyclone 100 may also include a sand collection vessel 108, which may be coupled with the cyclone body 104. After being separated from the mixed fluid, the underflow (e.g., separated solids or relatively denser fluids) may be received into the sand collection vessel 108, e.g., for storage therein, as will be described in greater detail below. The cyclone 100 may also include a blow-down nozzle 110, which may be connected to the sand collection vessel 108 proximal to a bottom thereof and may be used to evacuate or clean out the sand collected in the sand collection vessel 108.

Figure 2:
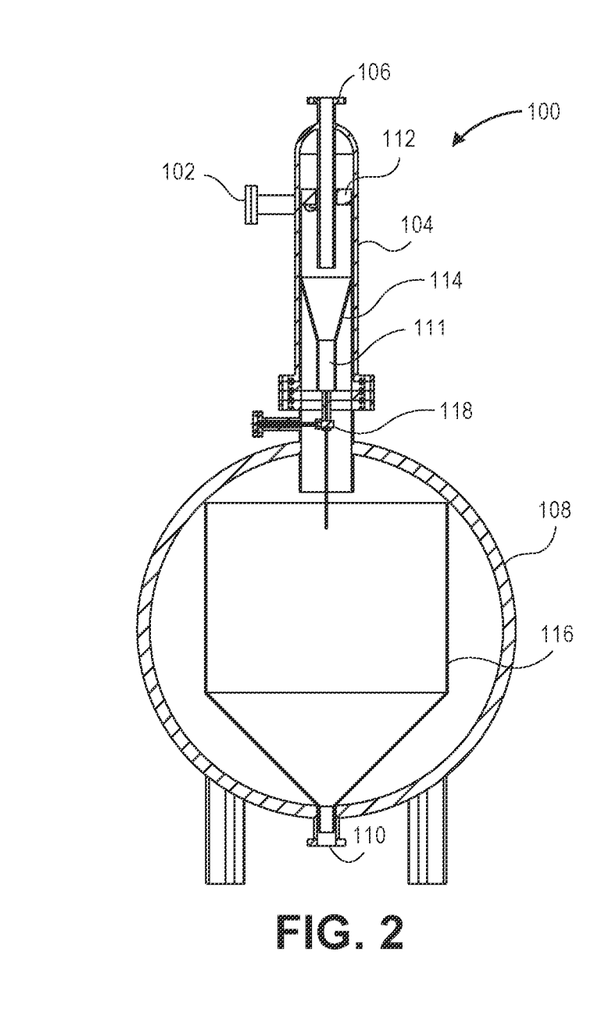
FIG. 2 illustrates a cross-sectional side view of the cyclone taken through line 2-2 in FIG. 1, according to an embodiment.

FIG. 2 illustrates a cross-sectional side view of the cyclone 100 taken through line 2-2 in FIG. 1, according to an embodiment. As shown, the cyclone body 104 may include an underflow or "solids" outlet 111 through which the underflow that is separated from the mixed fluid may proceed. Further, a cyclone starter insert 112 may be positioned at least partially within the cyclone body 104 and proximate to and/or axially-aligned with the inlet 102. The cyclone starter insert 112 may have an aerodynamic surface that directs the mixed fluid stream to begin its helical flow path in the cyclone 100 and avoid or mitigate turbulent flow. In at least one embodiment, the cyclone starter insert 112 may be or include spiral surface.

A cyclone insert 114 may also be positioned at least partially within the cyclone body 104. The cyclone insert 114 may be positioned between the inlet 102 and the sand collection vessel 108, and may communicate therewith via the underflow outlet 111. The cyclone insert 114 may define the shape of various internal characteristics of the cyclone body 104 (e.g., the inner diameter, the length of the cylindrical section, the angle of the conical section or filtering section, the size of the underflow outlet 111, the placement of the vortex finder, etc.).

A sand hopper 116 may be positioned at least partially within the sand collection vessel 108. For example, the sand hopper 116 may be suspended in the sand collection vessel 108, and may not rest on the bottom of the sand collection vessel 108. In an embodiment, the sand hopper 116 may be suspended from a flange 140 positioned at the inlet of the sand collection vessel 108. The sand hopper 116 may be configured to receive the solids (or higher density fluids) that drop out of the underflow outlet 111. Suspending the sand hopper 116 may allow for a more direct measurement of the weight of the sand hopper 116, which may provide a more accurate measurement of the amount of sand (and/or fluid and/or other solids) that are contained in the sand hopper 116.

Figure 3:
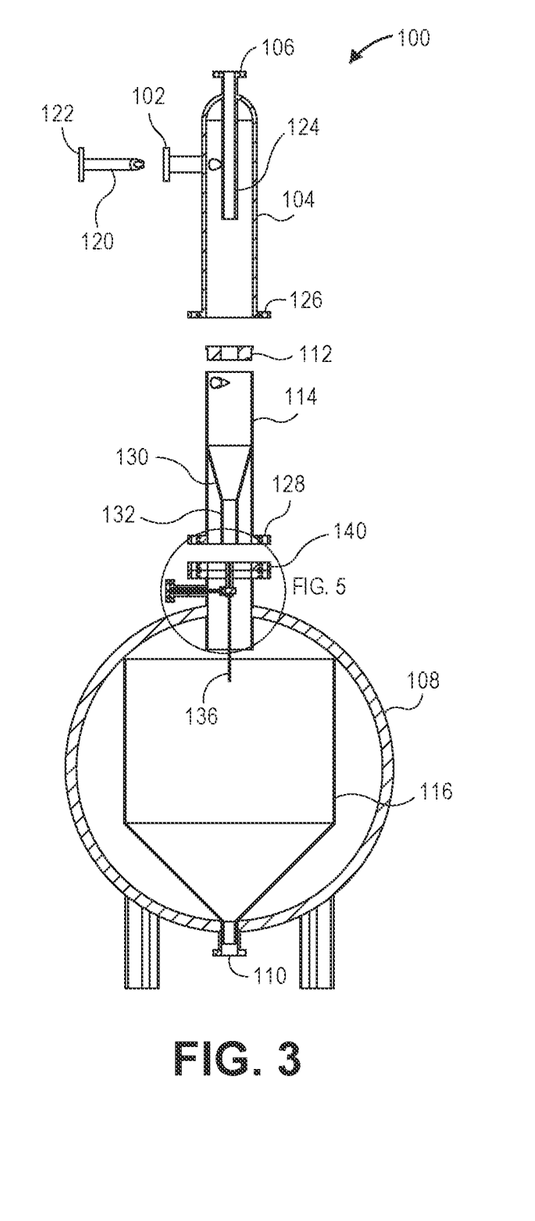
FIG. 3 illustrates an exploded cross-sectional side view of the cyclone shown in FIG. 2, according to an embodiment.

FIG. 3 illustrates an exploded cross-sectional side view of the cyclone 100 shown in FIG. 2, according to an embodiment. An inlet insert 120 may be configured to be inserted at least partially into the inlet 102. As described in greater detail below, the inlet insert 120 may have a tubular body with a bore formed at least partially axially therethrough. The inlet insert 120 may receive the fluid flow at the incoming large pipe diameter and converge the flowpath down to a predetermined inlet nozzle diameter, which may be eccentric to the pipe axis so as to align with the tangent of cyclone body 104. The inlet insert 120 may have a flange (e.g., a sandwich flange) 122 coupled to or integral with a distal end thereof to limit axial movement of the inlet insert 120 within the inlet 102. In at least one embodiment, the inserts (i.e., the cyclone starter insert 112, the cyclone insert 114, and/or the inlet insert 120) may be rigid and fixed in place, so that they do not move with respect to the remainder of the cyclone 100 (or any component thereof) during operation of the cyclone 100. The inlet insert 120 may be selected from a plurality of inserts having different sizes (e.g., diameter, axial length, etc.), depending on operating (e.g., well) conditions. Similarly, the cyclone starter insert 112 and/or the cyclone insert 114 may be changed/replaced (e.g., selected from a plurality of different inserts of the respective type) allows for modifications to the design if the well flow conditions change.

A cyclone overflow tube 124 may be positioned at least partially within the cyclone body 104. The cyclone overflow tube 124 may be in fluid communication with the overflow outlet 106. The cyclone overflow tube 124 may allow the cleaned fluid to exit the cyclone 100 via the overflow outlet 106.

As shown, the cyclone insert 114 may be configured to be inserted at least partially into the cyclone body 104. The cyclone starter insert 112 may be positioned at least partially within the cyclone body 104 and/or the cyclone insert 114. The cyclone body 104 may include a flange (e.g., a nozzle flange; RTJ style) 126 that may be configured to couple with a flange (e.g., a sandwich flange) 128 of the cyclone insert 114. The sand collection vessel 108 may include or be coupled to the flange 140, mentioned above. Thus, the flange 128 of the cyclone insert 114 may be sandwiched between two high pressure flanges 126, 140. As a result, the orientation and the features and datums of the cyclone starter insert 112 and/or cyclone insert 114 may be based off of the flange 128 itself, e.g., the flange 128 may be configured to guide the angular positioning of the cyclone insert 114. Thus, there may be no need for internal features on the cyclone body 104 to properly align or seal the cyclone insert 114. Alignment marks may be indicated on the cyclone body 104 and/or the flanges 126, 128, 140 to enable a user to visually confirm alignment.

A cyclone cone 130 may be positioned at least partially within and/or form a part of the cyclone insert 114. The cyclone cone 130 may take the primary vortex flow, which is large in diameter and travels in a downward direction, and reduce its diameter and send it upwards, making a secondary vortex spinning in the same direction and, e.g., concentric to the primary vortex flow, but traveling upward not downward. A diameter of the cyclone cone 130 may decrease proceeding downward. An underflow tube 132 may also be positioned at least partially within the cyclone insert 114, and may form part of the underflow outlet 111 (see FIG. 2). More particularly, the underflow tube 132 may be coupled to and/or in communication with a lower end of the cyclone cone 130.

The sand hopper 116 may be positioned at least partially within the sand collection vessel 108. For example, the sand hopper 116 may be suspended inside the sand collection vessel 108 and not otherwise provided with weight-bearing attachment to the sand collection vessel 108. In other words, the sand hopper 116 may be positioned within but not coupled directly to the sand collection vessel 108 in a structural manner. The sand hopper 116 may be hung from above, e.g., from the flange 140 via a line or another suspension assembly. As such, the weight of the sand hopper 116 may be measured, without consideration to the weight of the cyclone body 104 or components/contents thereof, and/or of the sand collection vessel 108.

For example, a first (e.g., male) hopper hanger clevis 136 may be positioned at least partially within the sand collection vessel 108 and/or the sand hopper 116. The first hopper hanger clevis 136 may be used to hang the sand hopper 116 from a second (e.g., female) load hanger clevis 146 (discussed below) using a load sensing pin. The clevises 136, 146 may also be referred to as couplings.

In at least one embodiment, a diameter of a lower portion of the sand hopper 116 may decrease proceeding downward. A lowermost end of the sand hopper 116 may in communication with the blow-down nozzle 110.

Figure 4:
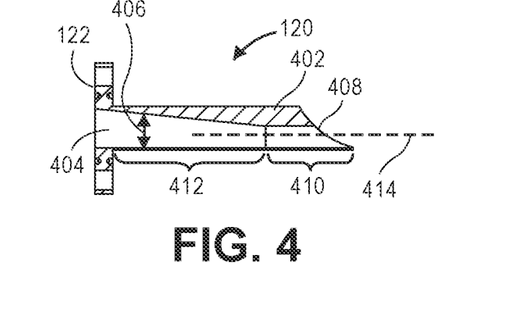
FIG. 4 illustrates an enlarged cross-sectional view of a portion of the cyclone shown in FIG. 3, according to an embodiment.

FIG. 4 illustrates an enlarged cross-sectional view of a portion of the cyclone 100, specifically the inlet insert 120, shown in FIG. 3, according to an embodiment. The inlet insert 120 may have a tubular body 402 having a bore 404 formed at least partially axially therethrough. In at least one embodiment, a diameter 406 of the bore 404 may remain substantially constant along a first axial portion 410 that is proximate to an inner end 408 of the inlet insert 120. The diameter of the bore 404 may then vary in a second axial portion 412 that is proximate to the flange 122. More particularly, the diameter of the bore 404 may increase in the second axial portion 412 proceeding toward the flange 122. In addition, the inner end 408 may not be perpendicular to a longitudinal centerline 414 through the body 402. Rather, a distance between the inner end 408 and the flange 122 may vary proceeding around a circumference of the inner end 408.

Figure 5:
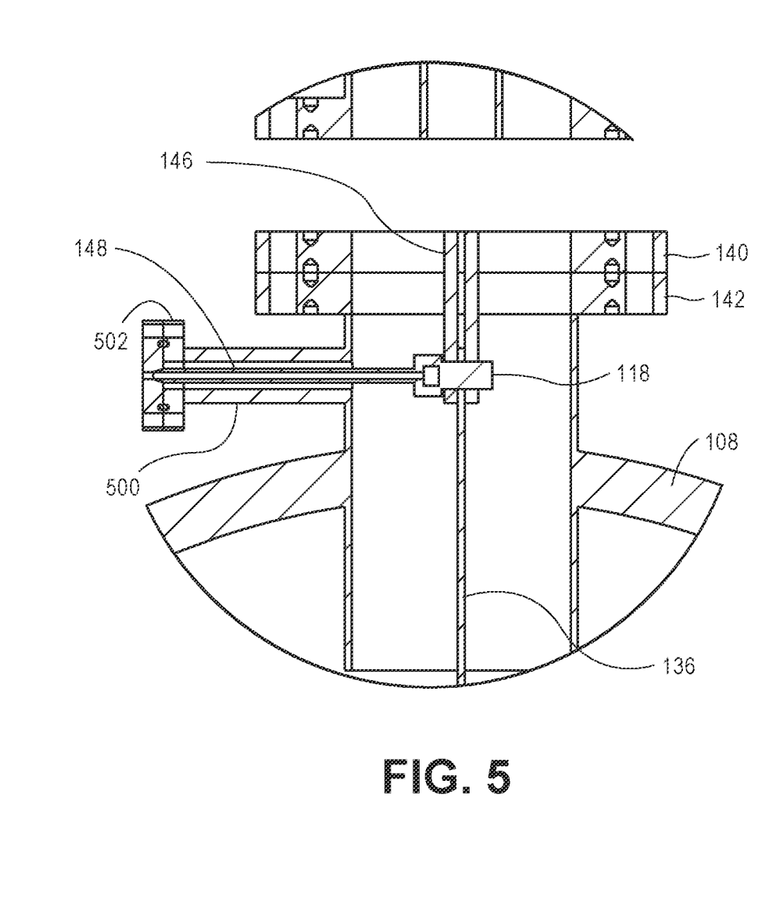
FIG. 5 illustrates an enlarged cross-sectional view of another portion of the cyclone shown in FIG. 3, according to an embodiment.
Figure 6:
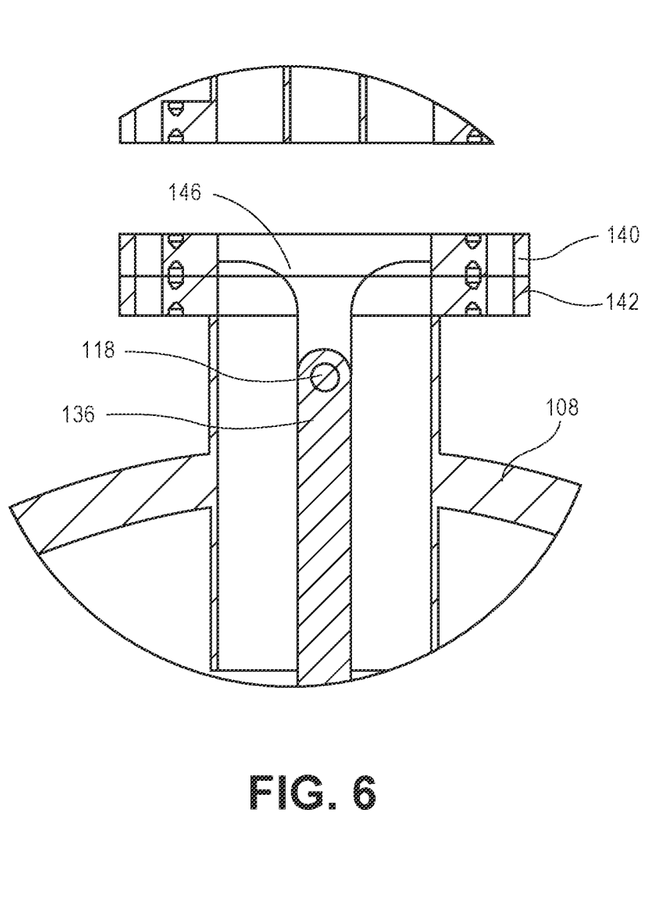
FIG. 6 illustrates an enlarged cross-sectional view of the portion of the cyclone shown in FIG. 5 after the cyclone has been rotated 90° back into the position shown in FIG. 1, according to an embodiment.

FIGS. 5 and 6 illustrate enlarged cross-sectional views of another portion of the cyclone 100 shown in FIG. 3, according to an embodiment. In this embodiment, FIGS. 5 and 6 are 90° offset from one another, with FIG. 5 being at the same angle as FIG. 3, and FIG. 6 being at the same angle as FIG. 1. The upper end of the sand collection vessel 108 may include or be coupled to the flange 140 that is configured to couple with the flange 128 of the cyclone insert 114. The flange 140 may be coupled to another flange 142, which may be a nozzle or RTJ style flange.

The first hopper hanger clevis 136 may extend at least partially through the flanges 140, 142. For example, the first hopper hanger clevis 136 may be connected to one of the flanges 140, 142. The first hopper hanger clevis 136 may also extend at least partially through a load pin (an example of a load cell) 118 and/or the second load hanger clevis 146. The hanging of the sand hopper 116 via the first and second hopper hanger clevises 136, 146 (as compared to setting it on feet) may allow for loads on the sand hopper 116 to be applied to the load pin 118. The load pin 118 being located in-line with a nozzle 500 extending through the sand collection vessel 108 (as shown), the cyclone body 104, or both. Further, the load pin 118 may extend through the underflow path between the cyclone body 104 to the sand hopper 116, and may allow a piece of tubing to align with the load pin 118 and allows for assembly of a weight mechanism. A blank flange 502 on an end of the nozzle 500 may be used to allow an atmospheric pressure conduit to a sensor of the load pin 118. The load pin 118 may engage the clevis 136 and determine a tension therein, as generated by the weight of the sand hopper 116.

The sandwich flanges 122, 128, and/or 140 may be used for bleed rings and small instruments. The sandwich flanges 122, 128, and/or 140 may also be used to mount internal structures, such as the inlet insert 120, the cyclone insert 114, and the second load hanger clevis 146. Often the bleed rings and the like do not have a full flange with the holes, as they do not orientate any component to another component, but are pinched-in via the RTJ fitting.

Any type of load cell/load pin 118 may be used, e.g., to measure tension in the suspension assembly (in this case, the clevis 136) from which the sand hopper 116 is suspended. For example, the load pin 118 may have a high differential pressure cavity. A high-pressure tubing 148 may extend at least partially through the nozzle 500 and be coupled to and/or in communication with the load pin 118. The tubing 148 may be in communication with the atmosphere on one side (e.g., outside the cyclone 100) and to the high-differential pressure cavity on the other side.

Figure 7:
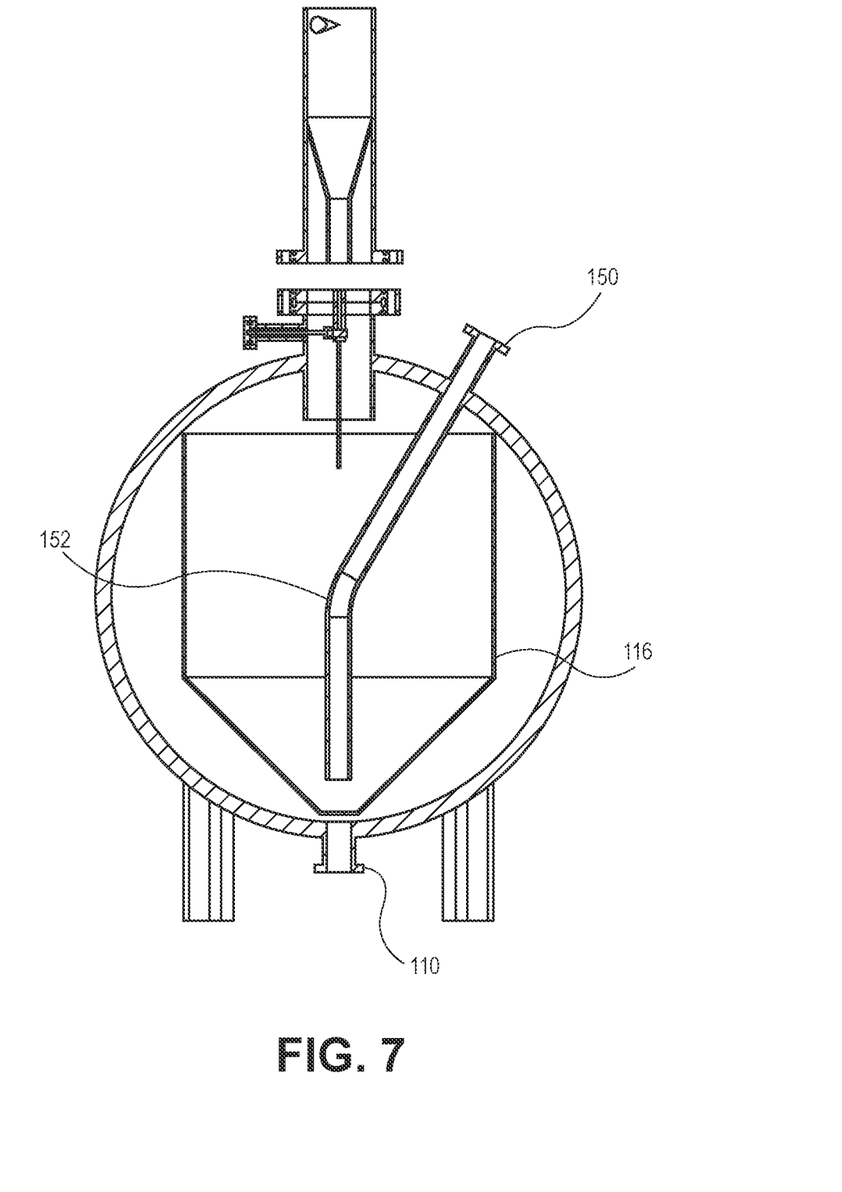
FIG. 7 illustrates a cross-sectional side view of the cyclone with an alternative hopper blow-down nozzle, according to an embodiment.

FIG. 7 illustrates a cross-sectional side view of the cyclone 100 with an alternative hopper blow-down nozzle 150, according to an embodiment. In this embodiment, the sand hopper 116 may not have an open drain at the bottom. Instead, it may have a tube 152 that reaches down to the bottom of the sand hopper 116 and sucks/vacuums out the particles (e.g., sand) in the bottom of the sand hopper 116. The blow-down nozzle 110 may remain present to clean out the sand collection vessel 108 (e.g., in the event that sand escapes the sand hopper 116. In this embodiment, a seal may be omitted.

Figure 8:
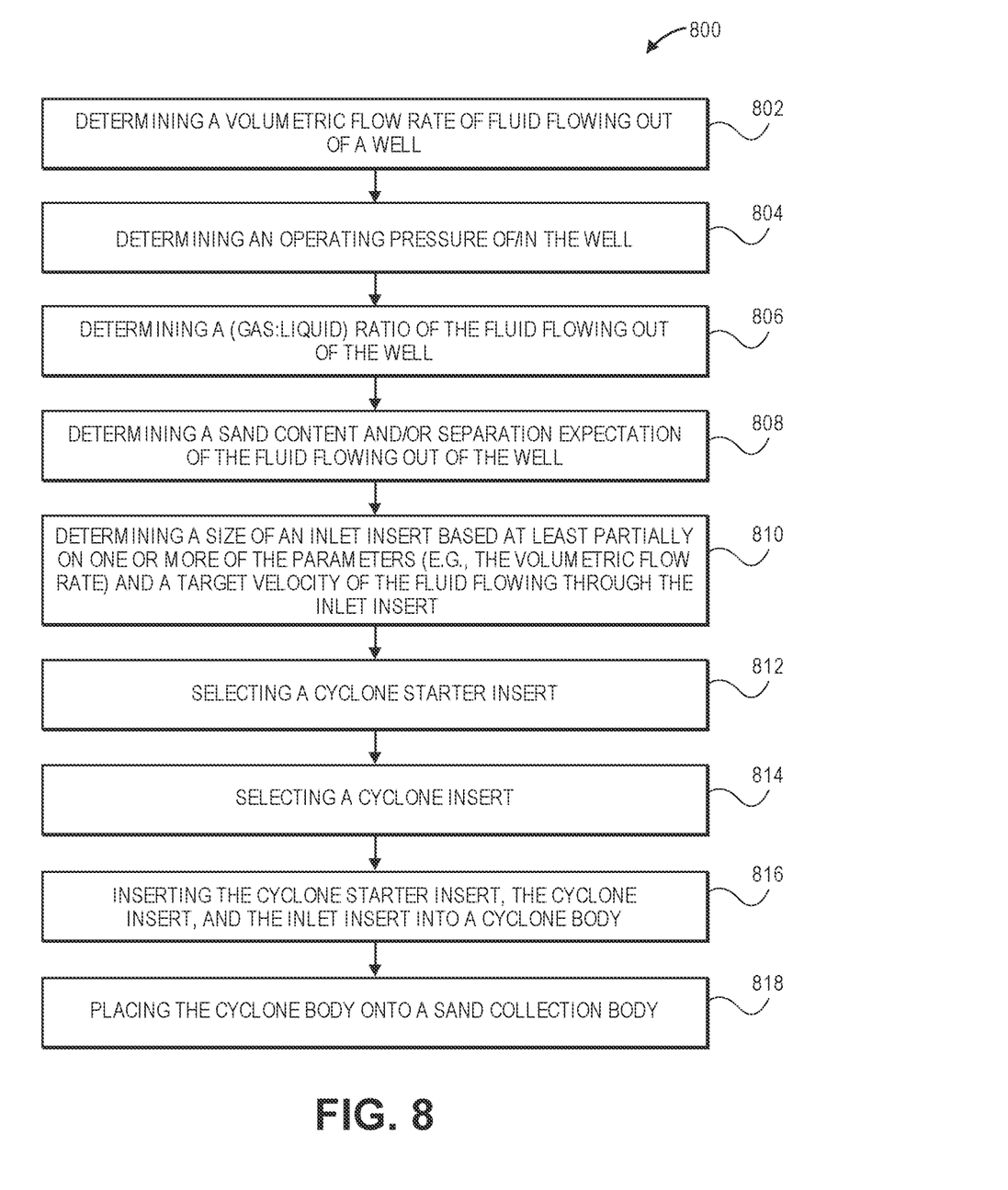
FIG. 8 illustrates a flowchart of a method for assembling (e.g., sizing) a cyclone, according to an embodiment.

FIG. 8 illustrates a flowchart of a method 800 for assembling (e.g., sizing) a cyclone 100, according to an embodiment. The method 800 may include determining (e.g., measuring) a volumetric flow rate of fluid flowing out of a well, as at 802. The method 800 may also or instead include determining (e.g., measuring) an operating pressure of the fluid in the well, as at 804. The method 800 may also or instead include determining (e.g., measuring) a (gas:liquid) ratio of the fluid flowing out of the well, as at 806. For example, the ratio may be 200,000 cubic feet per day (scfd) of gas and 5,000 barrels per day (bbpd) of oil that is API grade 50. The method 800 may also or instead include determining (e.g., measuring) a sand content and/or separation expectation (e.g., 100 microns) of the fluid flowing out of the well, as at 808.

Once one or more of the foregoing parameters are determined, the method 800 may include determining a size (e.g., exit diameter) of the inlet insert 120 based at least partially on one or more of the parameters (e.g., the volumetric flow rate) and a target velocity of the fluid flowing through the inlet insert 120, as at 810. For example, the user may select a target velocity of 65 ft/sec, and the size of the inlet insert 120 may be determined/selected such that it would cause the inlet velocity through the inlet insert 120 to be within a predetermined range (e.g., +/−5 ft/sec) of the target velocity (e.g., based at least partially upon the volumetric rate of the fluid flowing out of the well). As will be appreciated, 200,000 cfpd is much more voluminous at lower pressures, while the volume of the liquid generally does not vary with pressure.

A range of inlet inserts 120 may correspond to a cyclone body 104 with a particular size (e.g., diameter). For example, inlet inserts 120 from about 0.5 inches to about 1.5 inches may fit in a cyclone body 104 with an 8 inch diameter (e.g., because the cyclone body 104 has a 1.75 inch inlet 102). Thus, a 1.75 inch inlet insert 120 may be used in a larger cyclone body 104 having, for example, a 3 inch inlet 102. There may also be more than one height available for any given cyclone body diameter. In other words, each cyclone body 104 may have a short version and a tall version, which may accommodate cyclone inserts 114 of different sizes/lengths. Longer cyclone inserts 114 may have a longer dwell time that helps to separate sand depending on well conditions. A tall cyclone body 104 may be selected, not because there is more flow, but because the flow includes a higher liquid content or because the user wants to separate to a higher efficiency or lower particle size.

The method 800 may also include selecting a cyclone starter insert 112 based at least partially upon the size of the inlet insert 120, the location of the inlet insert hole, and the initial flowpath whether spiraling inwards or downwards primarily as a start, as at 812. The cyclone starter insert 112 may be inserted/assembled on top of the cyclone insert 114, and it may be secured before the cyclone insert 114 is inserted/assembled into the cyclone body 104. This may be used to determine whether the cyclone starter insert 112 works well for all sizes of inlet insert 120. If it does not, the cyclone starter insert 112 may be removed and replaced corresponding to even small changes in the size of the inlet 102.

The method 800 may also include selecting a cyclone insert 114 based at least partially upon the gas/oil/water volumetric percentages, the viscosity of the oil, and/or the size of the particle of sand targeted, as at 814. The cyclone insert 114 may have different lengths, cone dimensions, and/or angles to allow for longer or shorter dwell times (e.g., depending on the amount of fluid and its viscosity). For example, greater amounts of fluid and/or greater viscosity may require longer for the particles (e.g., sand) to separate therefrom. The inner diameter and cone dimensions may be changed to adapt to different well conditions and/or to improve cyclonic action.

The method 800 may also include inserting the cyclone starter insert 112, the cyclone insert 114, and the inlet insert 120 into the cyclone body 104, as at 816. The method 800 may also include placing the cyclone body 104 onto the sand collection vessel 108, as at 818. In at least one embodiment, a plurality of cyclone bodies 104 may be mounted/coupled to the top of a common sand collection vessel 108 (e.g., if a single cyclone body 104 cannot accommodate the entire flow). In another embodiment, several small cyclone bodies 104 may be selected, even if a single, larger cyclone body 104 can take the flow, but the smaller cyclone bodies 104 may offer higher efficiency or be able to remove smaller particles.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cyclone sand separator kit, comprising:
a cyclone body having an inlet, a fluid outlet, and a solids outlet, the inlet being configured to receive a mixed fluid including a solid portion and a fluidic portion, the solids outlet being configured to receive the solid portion separated from the fluidic portion, and the fluid outlet being configured to receive the fluidic portion separated from the solids portion; and
a plurality of cyclone inserts configured to be positioned in the cyclone body, at least partially between the inlet and the solids outlet and at least partially between the fluids outlet and the solids outlet, wherein the cyclone inserts each define a vortical section configured to induce inertial separation of the mixed fluid, and wherein the cyclone inserts include different geometries including different inner diameters, different lengths for respective cylindrical sections thereof, different angles for respective conical sections thereof, different underflow outlet sizes, different vortex finder placements, or a combination thereof; and a plurality of inlet inserts having different geometries, wherein the inlet inserts are each configured to be positioned at least partially in the inlet, wherein the inlet inserts are selectable depending on a well flow condition, wherein the inlet inserts are rigid and configured to be fixed in place at least partially in the inlet, such that the inlet inserts do not move with respect to the inlet, and wherein the inlet inserts each include a flange for removable connection of the inlet inserts into the inlet.

2. The kit of claim 1, wherein the cyclone inserts have different lengths such that the cyclone inserts are selectable in order to control dwell time of fluid therein depending on a liquid-to-sand concentration in the mixed fluid, a particle size of solids in the mixed fluid, a separation efficiency, or a combination thereof.

3. The kit of claim 1, further comprising a plurality of cyclone bodies including the cyclone body, the plurality of cyclone bodies have different heights selectable based on a height of a selected one of the cyclone inserts such that the selected one of the cyclone bodies is sized to contain the selected one of the cyclone inserts therein.

4. The kit of claim 1, further comprising a plurality of cyclone starter inserts each configured to be positioned in the cyclone body, proximate to and axially-aligned with the inlet thereof, wherein the cyclone starter inserts are each configured to initiate helical flow in the mixed fluid that is received through the inlet, and wherein the cyclone starter inserts are selectable based on a well flow condition.

5. The kit of claim 1, wherein the different geometries of the cyclone inserts include different lengths, cone dimensions, angles, or a combination thereof, to allow for longer or shorter dwell times depending on an amount of fluid in the mixed fluid relative to an amount of solids therein, a viscosity of the fluid portion of the mixed fluid, or a combination thereof.

6. The kit of claim 1, wherein the different geometries of the inlet inserts include different exit diameters.

7. The kit of claim 1, wherein the well flow condition comprises relative gas, oil, and water volumetric percentages in the mixed fluid, a viscosity of an oil component of the mixed fluid, a particle size of sand targeted for separation from the mixed fluid, or a combination thereof.

8. The kit of claim 1, wherein a nozzle of at least one of the plurality of inlet inserts is eccentric to a central axis of a tubular body of the at least one of the inlet inserts.

9. The kit of claim 1, wherein the inlet inserts each include a flange configured to be removably secured to a flange of the cyclone body at an end of the inlet.

10. The kit of claim 1, further comprising a sand collection vessel configured to be coupled to the solids outlet, the sand collection vessel being configured to store solids therein.

11. The kit of claim 10, wherein each of the cyclone inserts comprises a flange, the flange of the cyclone inserts being configured to be sandwiched between a flange of the cyclone body and a flange of the sand collection vessel so as to permit control of a rotational alignment of the cyclone insert in the cyclone body.

12. The kit of claim 10, further comprising:
a sand hopper suspended in sand collection vessel; and
a load cell configured to determine a weight of the sand collection vessel without determining a weight of the cyclone body.

13. A method for assembling a cyclone separator, comprising:
determining a volumetric flow rate of fluid flowing out of a well;
determining a target velocity of the fluid flowing through an inlet insert after the fluid flows out of the well;
selecting the inlet insert from a plurality of inserts based at least partially upon the volumetric flow rate of the fluid and the target velocity of the fluid, wherein the plurality of inlet inserts are rigid and configured to be fixed at least partially in place in the inlet, such that the inlet inserts do not move with respect to the inlet, and wherein the inlet inserts each include a flange for removable connection of the inlet inserts at least partially in the inlet;
selecting a cyclone starter insert from a plurality of cyclone starter inserts based at least partially upon a diameter of the cyclone starter insert and a first well flow condition;
selecting a cyclone insert from a plurality of cyclone inserts based at least partially upon a height of the cyclone insert and a second well flow condition, wherein the plurality of cyclone inserts each define a vortical section configured to induce inertial separation of the mixed fluid, and wherein the cyclone inserts include different geometries including different inner diameters, different lengths for respective cylindrical sections thereof, different angles for respective conical sections thereof, different underflow outlet sizes, and different vortex finder placements; and
inserting the inlet insert, the cyclone starter insert, and the cyclone insert into a cyclone body.

14. The method of claim 13, further comprising selecting the cyclone body from a plurality of cyclone bodies based on a height of the cyclone bodies and the height of the selected cyclone insert.

15. The method of claim 13, further comprising determining an operating pressure of the fluid in the well, wherein the inlet insert is also selected based at least partially upon the operating pressure.

16. The method of claim 13, further comprising determining a gas-to-liquid ratio of the fluid flowing out of the well, wherein the inlet insert is also selected based at least partially upon the gas-to-liquid ratio.

17. The method of claim 13, further comprising determining a sand content of the fluid flowing out of the well, wherein the inlet insert is also selected based at least partially upon the sand content.

18. A modular cyclone separator, comprising:
a cyclone body comprising an inlet and an underflow outlet, wherein the inlet is configured to receive a mixed fluid therethrough and into the cyclone body, wherein an underflow is separated from the mixed fluid and directed to the underflow outlet;
a stationary inlet insert removably positioned in inlet and coupled to an outside of the cyclone body, the inlet insert being rigid and configured to be fixed in place at least partially in the inlet, such that the inlet insert does not move with respect to the inlet, and wherein the inlet insert includes a flange for removable connection thereof at least partially in the inlet, the inlet insert comprising a tubular body having an inner end defining a nozzle and extending from the flange to the inner end, the tubular body defining a bore formed at least partially axially therethrough, the bore defining a first axial portion extending from the inner end and a second axial portion extending from the flange to the first axial portion, wherein the bore is substantially constant in diameter along the first axial portion, and wherein the bore increases in diameter along the second axial portion as proceeding from the first axial portion to the flange, and wherein a distance between the inner end and the flange varies around a circumference of the inner end, and wherein the nozzle is configured to direct the mixed fluid generally tangent to an interior surface of the cyclone body;

a cyclone insert removably positioned at least partially within the cyclone body, wherein the cyclone insert comprises a conical cyclone and a height configured to produce a predetermined dwell time for fluid in the conical cyclone;

a cyclone starter insert removably coupled to the cyclone insert and positioned in the cyclone body, wherein the cyclone starter insert is received at least partially in the cyclone insert, and wherein the cyclone starter insert is configured to induce a vortical flow in the mixed fluid received through the inlet insert; and a sand collection vessel removably coupled to the cyclone body and in communication with the underflow outlet, wherein the underflow is directed to within the sand collection vessel when separated from the mixed fluid in the cyclone body, and wherein the cyclone insert and the cyclone starter insert are removable from within the cyclone body by disconnecting the cyclone body and the sand collection vessel.

19. The cyclone separator of claim 18, further comprising:

a plurality of cyclone inserts having different shapes, wherein the plurality of cyclone inserts include different geometries including different inner diameters, different lengths for respective cylindrical sections thereof, different angles for respective conical sections thereof, different underflow outlet sizes, different vortex finder placements, and wherein the cyclone insert is selected from the plurality of cyclone inserts based on the different shapes and a well flow condition, and wherein a remainder of the cyclone inserts are not positioned in the inlet;

a plurality of cyclone starter inserts having different shapes, wherein the cyclone starter insert is selected from the plurality of cyclone starter inserts based on the different shapes of the starter inserts and a well flow condition, and wherein a remainder of the plurality of cyclone starter inserts are not positioned in the cyclone body; and a plurality of inlet inserts having different shapes, wherein the inlet insert is selected from the plurality of inlet inserts based on the different shapes of the inlet inserts and a well flow conditions, and wherein a remainder of the inlet inserts are not connected to the cyclone body.

\* \* \* \* \*